US006563278B2

(12) United States Patent
Roman

(10) Patent No.: US 6,563,278 B2
(45) Date of Patent: May 13, 2003

(54) AUTOMATED GARAGE DOOR CLOSER

(75) Inventor: Ronald J. Roman, Chicago, IL (US)

(73) Assignee: Noostuff, Inc., Chicago, IL (US)

( * ) Notice: Subject to any disclaimer, the term of this patent is extended or adjusted under 35 U.S.C. 154(b) by 0 days.

(21) Appl. No.: 09/750,992

(22) Filed: Dec. 28, 2000

(65) Prior Publication Data

US 2001/0013762 A1 Aug. 16, 2001

Related U.S. Application Data

(63) Continuation-in-part of application No. 09/358,970, filed on Jul. 22, 1999, now abandoned.

(51) Int. Cl.[7] ................ H02P 1/04

(52) U.S. Cl. ................ 318/282; 318/280; 318/281; 318/286; 318/466; 318/468; 49/26; 49/28

(58) Field of Search ................ 318/466, 468, 318/280, 282, 286, 281; 49/26, 28

(56) References Cited

U.S. PATENT DOCUMENTS

| | | | | |
|---|---|---|---|---|
| 2,807,460 A | | 9/1957 | Guimont | 268/74 |
| 3,060,361 A | | 10/1962 | Purdy | 318/266 |
| 3,510,982 A | | 5/1970 | Purdy | 49/30 |
| 3,617,835 A | | 11/1971 | Dreher et al. | 318/266 |
| 3,733,747 A | | 5/1973 | Fox et al. | 49/30 |
| 4,035,702 A | | 7/1977 | Pettersen et al. | 318/285 |
| 4,037,201 A | | 7/1977 | Willmott | 340/167 R |
| 4,119,896 A | | 10/1978 | Estes, III et al. | 318/266 |
| 4,134,050 A | | 1/1979 | Sibalis | 318/267 |
| 4,234,833 A | | 11/1980 | Barrett | 318/282 |
| 4,263,536 A | | 4/1981 | Lee et al. | 318/266 |
| 4,364,003 A | | 12/1982 | Phipps | 318/467 |
| 4,393,342 A | | 7/1983 | Matsuoka et al. | 318/467 |
| 4,463,292 A | | 7/1984 | Engelmann | 318/283 |
| 4,939,434 A | | 7/1990 | Elson | 318/285 |
| 5,027,553 A | | 7/1991 | Vergara | 49/30 |
| 5,233,185 A | | 8/1993 | Whitaker | 250/222.1 |
| 5,247,232 A | | 9/1993 | Lin | 318/468 |
| 5,357,183 A | * | 10/1994 | Lin | 318/468 |
| 5,406,179 A | | 4/1995 | Davall et al. | 318/286 |
| 5,510,686 A | | 4/1996 | Collier | 318/446 |
| 5,596,840 A | * | 1/1997 | Teich | 49/26 |
| 5,787,365 A | | 7/1998 | Rivero et al. | 455/567 |
| 5,955,031 A | * | 9/1999 | King, Jr. | 422/98 |
| 6,020,703 A | | 2/2000 | Telmet | 318/480 |
| 6,111,374 A | * | 8/2000 | Fitzgibbon et al. | 318/282 |

* cited by examiner

*Primary Examiner*—Robert E. Nappi
*Assistant Examiner*—Rita Leykin
(74) *Attorney, Agent, or Firm*—James A. Geppert

(57) ABSTRACT

An automated garage door closing device for a remote controlled overhead garage door wherein the device is mounted on one of a pair of parallel tracks receiving rollers suitably mounted on the outer edges of the door panels, the device including a switch housing containing a switch for the leading edge of the door, and a circuit located in a second housing adjacent the garage floor and including an interval timer acting to close the door after a predetermined period of time, an audible alarm which is activated upon the garage door reaching the fully open position, a switch deactivating the entire unit when the garage door is deliberately to be left in the fully open position, and a flexible switch arm extending through the switch housing to a position to engage the upper edge of the garage door panel and acts to activate the automated closing device. A recycle delay circuit in the timing circuit acts to deactivate the unit upon interruption of the door closing operation if door movement is reversed and returned to the open position, and a sensor providing a sensor beam adjacent the garage floor to measure the time interval of interruption of the sensor beam to determine if a vehicle has exited or entered the garage or a person or animal has interrupted the beam. Also, a carbon monoxide detector is inserted in the circuit to provide activation of the door opening cycle if the level of carbon monoxide reaches a dangerous level.

20 Claims, 3 Drawing Sheets

AUTOMATED GARAGE DOOR CLOSER

The present application is a continuation-in-part of U.S. patent application Ser. No. 09/358,970, filed Jul. 22, 1999 now abandoned.

TECHNICAL FIELD

The invention disclosed herein relates to an improved garage door closer that will automatically act to close a garage door that is left open for a specified period of time to prevent unwanted access to the garage.

BACKGROUND

Most residences are provided with garages which are either separated from the main residence or are directly connected to the house or through a breezeway, and have a connecting doorway from the garage into the house for entrance or egress therefrom; the garage having space for one or more vehicles. Of these garages, many have one or more overhead garage doors which travel on pairs of generally parallel tracks at the sides of the door opening from a closed vertical position to a substantially horizontal open position a short distance below the ceiling of the garage. Although a garage door may be manually opened or closed by the owner, the vast majority are provided with a reversible electric motor for raising and/or lowering the door, the motor being actuated by a wall switch on a wall of the garage or through a remote radio transmitter carried in the vehicle to send a signal from the vehicle driver to a receiver operatively connected to the motor to open or close the door. Thus, in inclement weather conditions, the driver is not obligated to leave the vehicle to open or close the door.

One problem with an automated overhead garage door is that, occasionally the door is unintentionally left in the open position when leaving the garage. When this happens, the security of the residence may be compromised by unauthorized entry into the garage and/or access to the house by burglars by breaking into the house through the connecting door leading from the garage to the house. Obviously, such a security breach is unwelcome and may result in property losses of objects stolen from the garage and/or house.

There have been a number of proposed solutions to this problem, however, many of the solutions are mechanical in nature and require specially manufactured parts. Also, electronic solutions to the problem have been suggested, but these systems lack versatility and have disadvantages regarding power supply and limitations in the timer function. Further, problems may occur with a premature closing of the garage door that might result in the door closing on a vehicle or locking a person out of his house. The present invention overcomes these problems in a simplified solution for automatically closing the garage door and is in conformity with United Underwriters Laboratory regulations.

SUMMARY OF THE INVENTION

The present invention relates to a novel and improved automated garage door closing device including a variable timing mechanism, optical sensor, carbon monoxide detector and activation switch. The activation switch is mounted to the door support rail and triggered when the door reaches the open position. The timing device, carbon monoxide detector and optical sensor, which are mounted in an enclosed case, are attached to the door support rail approximately eighteen inches from the garage floor. The sensor is directed to the opposite end of the door opening to a reflector mounted at the same height. The timing device is powered by a twelve-volt DC power supply, and two wires are attached to the activation switch previously described to activate the device when the door is opened. The timing device has a terminal for attaching two wires to the door opener that activates the door opener when a relay in the timing device is activated. The terminal can also be substituted with a radio transmitter that can learn the code of the door opener to eliminate the need for wires.

When the garage door is opened, the timing device is ready for the sequence of events. The timer that activates the door opener will not activate until a vehicle enters or leaves the garage. The timer is ready to be activated when the sensor is interrupted for at least three seconds or more. The activation of the timer takes place one second after the sensor returns to normal operation. The timer can be adjusted to activate the relay from thirty seconds to five minutes. When the timer is activated, an audible alarm provided in the unit will give an intermittent signal to warn the operator that the system is armed and that the door will automatically close. Shortly before closing, the alarm becomes more rapid in sound to announce the closing. If, during the closing of the door, an obstruction would occur returning the door to its open position, the closer device would automatically turn itself off. The automatic door closer cannot be activated again until the door is closed by the operator and remains closed for one and one-half minutes.

The unit also contains a carbon monoxide detector. If, after the timer closes the garage door and the engine of a vehicle is not turned off, dangerous carbon monoxide levels can build within the closed garage. When the level of carbon monoxide reaches the danger level, an alarm will sound and simultaneously this device will trigger the relay in the timing unit to activate the door opener and open the closed garage door.

A unique feature of this timing sequence is that it will allow a person or animal to pass through the sensor beam without activating the timer. This is important, allowing the user to use the open garage door as egress.

After an arriving or leaving vehicle activates the timing device and the sensor beam is interrupted again, the device will be deactivated. This is a safety feature to eliminate the possibility of entrapping a person or animal in the garage. The unit will remain deactivated until the user closes the overhead garage door and it remains closed for at least one and one-half minutes. When the garage door is reopened, the timing device is again ready for its sequence of events. The unit also has a manual switch that can be used to deactivate the unit when the overhead door is in the open position.

ILLUSTRATIVE EMBODIMENT OF THE INVENTION

Figure 1:
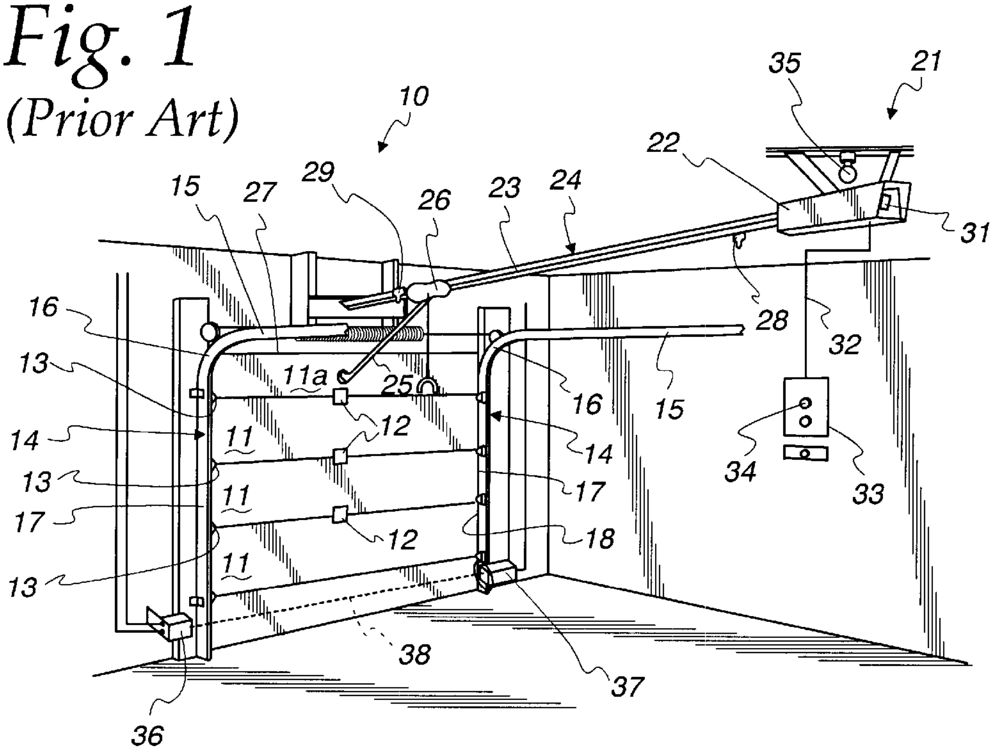
Fig. 1 (Prior Art)
FIG. 1 is a perspective view of a prior art garage door closer device mounted in the door opening for an overhead door.

Referring more particularly to the disclosure in the drawings wherein is shown an illustrative embodiment of the present invention, FIG. 1 discloses a prior art overhead garage door 10 consisting of a plurality of door panel segments 11, 11*a* which are joined together by horizontally spaced hinges 12, 12, each horizontal panel segment having one or more pairs of vertically spaced sets of rollers 13, 13 that are guided in a pair of generally parallel tracks 14, 14; which tracks include a generally horizontal portion 15 and a generally vertical portion 17 at right angles to the vertical portion and joined by a curved intermediate portion 16 mounted in the opening 18 for entry of a vehicle into and from the garage. A garage door opening mechanism 21 consists of a reversible electric motor 22 which either drives an elongated screw or a gear 23 to move an endless chain in a central overhead track 24; a bracket 25 being secured to the upper edge 27 of the upper panel segment 11*a* of the garage door 10 and operationally connected to the screw or chain by a follower 26. Also, the overhead track 24 is provided with a pair of limit switches 28, 29, respectively, that are positioned adjacent the ends of the central track 24 and are adapted to be engaged either by a portion of the garage door panel segment 11 or a portion of the closer unit bracket 25 to de-energize the electric motor 22 at either end of garage door travel. Likewise, the garage door could comprise a single panel of a size to close the opening 18 of the garage, but without articulation; the door taking a different path of movement for opening and closing when actuated by the closer unit. All of this structure is conventional and well known.

The garage door opening mechanism 21 includes a receiver 31 that is mounted adjacent and operatively connected to the reversible electric motor 22, and a transmitter (not shown) carried by the operator of or located in the vehicle of the garage owner provides a signal to the receiver 31 to open or close the door. Also connected to the receiver by wiring 32 is a wall switch 33 having a push button 34 to actuate the motor. The closer may further include a ceiling light 35 which can be mounted on the unit or other suitable support in the ceiling of the garage, which light is actuated when the motor is energized and the unit has a time delay mechanism (not shown) that retains the light in an illuminated state for a predetermined period of time after the motor is energized. After the set period, the light is extinguished and remains off until the receiver is again energized. Also located adjacent the lower ends of the rails 14 are a pair of photo-eye sensors 36 and 37 mounted to project a beam 38 of light across the garage door opening which, when interrupted by an object as the door is closing, will reverse movement of the door to its open position; a safety feature required by UL regulation UL 325.

The present invention relates to an automated closing device for the garage door including a-two-part housing 41 consisting of a body portion 43 and a cover 44 which nest together to form an enclosed unit for an activating switch 48. The cover 44 is provided with one or more pairs of spaced raised loops 45 adjacent the ends of the cover resulting in openings 46 to receive at least one strap 47 that passes through a pair of openings 46 and around the housing 41 and the horizontal portion 15 of one track 14 to support the housing on the rail; the housing being mounted on the horizontal track portion and positioned adjacent the end of movement of the upper door panel 11*a*.

Figure 5:
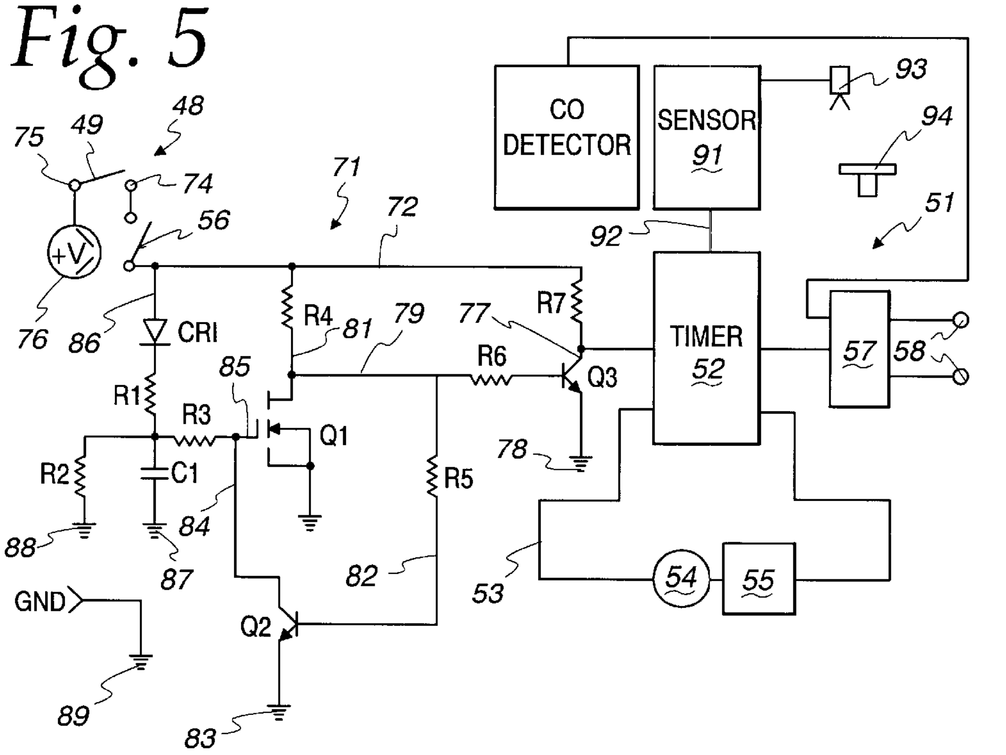
FIG. 5 is a schematic showing of the control circuit for the automated closer.

Within the housing 41 is mounted the switch 48 having a flexible finger 49 to be engaged by the leading edge 27 of the upper garage door panel 11*a*. A control circuit 51 for the door closing device is shown in FIG. 5 and includes a timing device 52 consisting of an RC oscillator chip (designated MC14541B and manufactured by Motorola Corporation) that contains an oscillator providing a timing function; the circuit 51 being located in a second or sensor housing 61. The circuit includes a transformer (not shown) connected to a 120 volt AC source which provides 12 volt DC power at 76, and a line 53 extending between a pair of pins on the timing device or chip 52 includes an audible alarm 54 in series with a Schmit trigger inverter 55. A relay 57 is connected to the timing device 52 and is activated when the predetermined time interval (such as five minutes) elapses, the relay being connected to the door opener switch terminals 58; the terminals being connected to the line 32 of manual wall switch 33. The Schmit trigger inverter 55 in line with the alarm 54 acts to sound the alarm at pre-selected intervals, such as every ten seconds until fifteen seconds remain before the door closes, at which time the signal frequency increases and, at the five minute mark, the circuit actuates the drive motor to cause the door to descend.

Also connected to the timing chip 52 is a secondary portion 71 of circuit 51 including a line 72 extending from a pin on the chip through a resistor R7 to an on/off switch 56 in series with one side 74 of the micro-switch 48 that is closed when the garage door is opened, the opposite terminal 75 of the switch 48 being connected to the voltage source 76. The line 72 branches at 77 to the collector of a transistor Q3, the emitter leading to ground at 78. A line 79 from the base of transistor Q3 extends through a resistor R6 to intersect a branch line 81 extending between line 72 and a terminal of a second transistor Q1; line 81 containing a resistor R4. Another branch line 82 containing a resistor R5 extends from line 79 to the base of a third transistor Q2, with the emitter from this transistor grounded at 83, and a line 84 from the collector of a transistor Q2 extends to a line 85 from the base of transistor Q1, line 85 containing a resistor R3 and intersecting a third branch line 86 from line 72. Branch line 86 includes a diode CR1 and a resistor R1 on one side of line 85 and a capacitor C1 leading to ground 87 on the opposite side. The line 85 terminates beyond the third branch line 86 in a resistor R2 and is grounded at 88, and the voltage supply is grounded at 89.

Connected to the timing chip 52 through a line 92 is a sensor 91 that is connected to a second photo-eye sensor 93 and opposing reflector 94, which sensor is programmed to activate the timer/closer device when a vehicle leaves the garage. In view of the bulk and length of an automotive vehicle, the sensor beam 95 is interrupted for a sufficient interval that the sensor will activate the device.

In normal operation, (the door having been closed for a long time), when the door is opened to close the switch 48, power is applied to the timer's voltage input 76 (approximately 12 volts DC). Capacitor C1 is discharged which holds the gate of transistor Q1 low so transistor Q1 is off. With transistor Q1 off, the resistors R4, R5 and R6 form a voltage divider network that applies sufficient base voltage to turn on transistors Q2 and Q3. When transistor Q2 is on, it grounds the gate of transistor Q1, which prevents transistor Q1 from turning on as capacitor C1 charges up. Also, with transistor Q3 on, the reset input to the timing chip 52 is low, enabling timer operation.

When the timer is operating, capacitor C1 charges up to approximately the voltage supply level through diode CR1 and resistor R1. The resistor R1 and capacitor C1 network provides a power up delay of about 1.5 seconds allowing the timer to latch the operational state. When the timer circuit completes the time delay, the output relay 57 is activated which causes the door to close. When the door closes, the door switch 48 opens removing power from the timer. With the power removed, capacitor C1 starts discharging through resistor R2. Diode CR1 prevents discharge current flow back through resistor R1. It takes about one minute for capacitor C1 to discharge to a level that will be low enough to allow another timer cycle.

If the door hits an obstruction that causes the door to reopen within the one-minute capacitor discharge time, the re-cycle fault circuit 71 prevents another time delay cycle. When power is re-applied and capacitor C1 is still charged up, the transistor Q1 is on grounding the junction of resistors R4, R5 and R6. With that point grounded, transistors Q2 and Q3 are off. When transistor Q3 is off, the reset input to the timing chip 52 is high, disabling the timer, and the timer will not operate again until a remote switch closes the door or power is removed for the capacitor C1 discharge delay time.

This device presents a complete package for the homeowner that possesses a garage with an overhead garage door having a remote control opening device including the photoelectric eye beam, and the present device will act to automatically close the overhead door if the owner should forget to do so; the device being easily installed by a homeowner with a minimum of tools and equipment. The closed housing 41 contains the activating switch 48 for the device and the second or sensor housing 61 is provided adjacent the photoeye placement adjacent the floor of the garage to contain the electronics for the device with the exception of the power supply. One or more nylon straps 47 are used to position and secure the switch 48 in housing 41 next to the door edge when the door is in the "up" position, and the strap is secured to the door rail or track 14.

This automated door closing device has a number of advantages for the home owner:

1. Easy installation.
2. Audible alarm sound is immediate when the system is activated.
3. A low voltage system that is safe to use.
4. Allows passage of a person through the door opening without activation of the door closing device.

Figure 2:
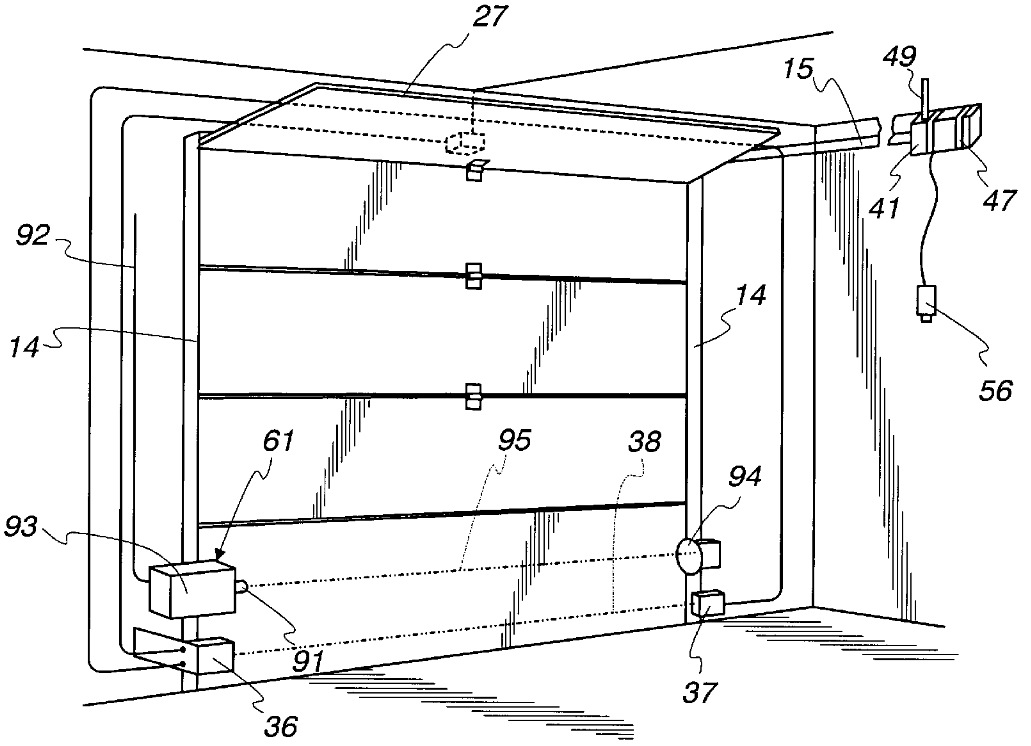
FIG. 2 is an enlarged perspective view similar to FIG. 1 but showing the improved control device of the present invention.
Figure 3:
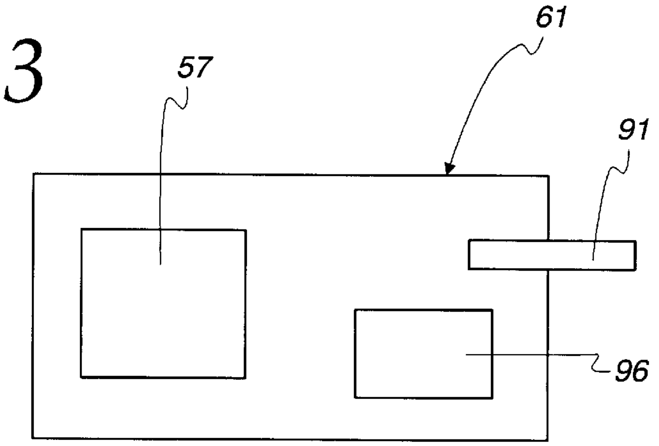
FIG. 3 is a block diagram of the control unit found in FIG. 2.
Figure 4:
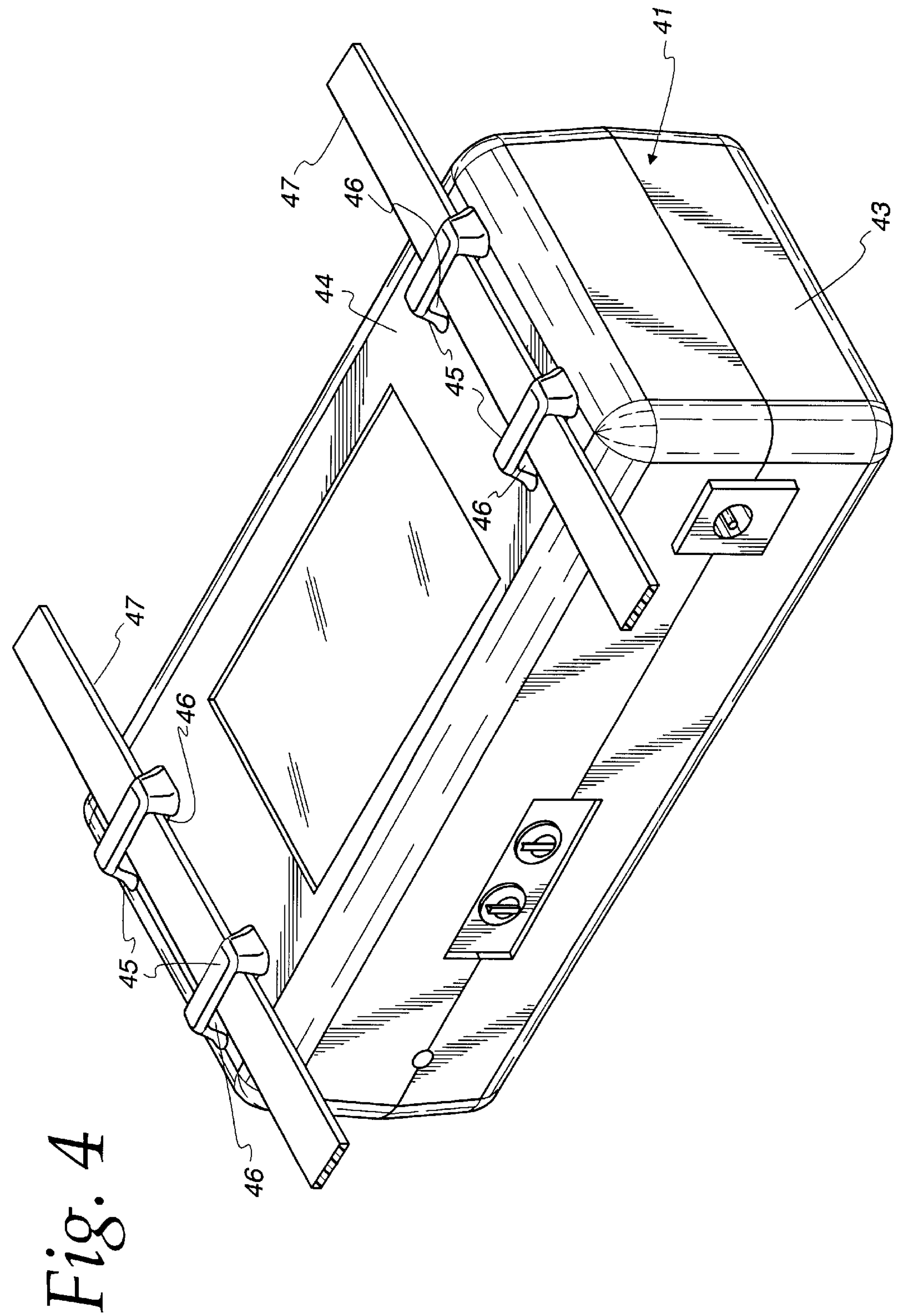
FIG. 4 is an enlarged perspective view of the activating door switch for the control unit.

The unit is designed to operate with garage door openers containing sensors as shown in FIGS. 1 and 2 of the drawings; wherein the sensors are installed adjacent ground level for the garage door 10. When the door opening mechanism 21 operates to open the door, the door moves in the tracks 14, 14 by the motor until the door reaches a filly open position, which in turn, closes the switch 48. Once the door is opened, the sensor 91 through interruption of the beam 95 for a pre-determined time interval, such as three seconds, detects a vehicle entering or exiting the garage, which will activate the circuit 51 to initiate a cycle and automatically close the door after the variable time period expires; the circuit activating the motor to close the door. However, if a person or an animal passes through the open door during the timing cycle, the person or animal interrupts the light beam 95 of the sensor 91 momentarily, the sensor notes the shorter time interval of beam interruption, and the circuit will be deactivated. This will prevent entrapment of a person or animal within the garage. Once the circuit for the door is deactivated, it will remain deactivated until the door is intentionally closed by an operator and remains closed for a pre-determined time interval, such as one and one-half minutes; which action resets the device. Then, when the door is opened and a vehicle enters the garage, the device will be activated for another cycle.

If the garage is situated in an alley necessitating the jockeying of the vehicle into or out of the garage, once the door is opened, the vehicle will break the beam 95 one or more times until the vehicle is fully positioned in the garage. During this jockeying, although the beam is interrupted for the required minimum time interval, the sensor will not activate the timer cycle. When the vehicle is fully positioned in the garage and the beam is uninterrupted for a set time interval, the sensor will sense that the vehicle is present and activates the circuit to start the timing cycle for automatically closing the door.

When the device completes the cycle and initiates closing of the garage door, if an object or person is within the path of the closing door, the door will reverse and engage the switch finger 49, and the sensor will disable the timer. Again, the device cannot be activated until a preset time period is exceeded and the door is manually activated by the vehicle operator. The device can be deactivated at any time with the manual switch 56. The unit also may contain a carbon monoxide detector 96 connected by line 97 to the relay 57. If, after the timer closes the garage door and the engine of a vehicle is not turned off, dangerous carbon monoxide fumes can build within the closed garage area. When the level of carbon monoxide reaches the danger level, an alarm will sound and simultaneously this device will trigger the relay 57 to activate the door opener and open the closed garage door.

What is claimed is:

1. An automatically controlled garage door closer device for installation on a garage having a door opening and a garage door with an upper edge and a lower edge, a reversible electric motor providing motive power to move the door between open and closed positions on a pair of parallel tracks, and sensor means adjacent the lower edge of the door opening providing a beam projected across the opening, said device acting to automatically close the door if said door is inadvertently left open after a vehicle enters or exits the garage and comprises a switch housing adapted to be mounted on one of said tracks guiding the door between open and closed positions adjacent the final open position of the door, a switch within the housing having a flexible finger extending beyond the housing and into the path of the upper door edge, and a second housing containing said sensor means and a control circuit including timer means operatively connected to the motive power for the garage door for energization of the door closer once a predetermined period of time has elapsed after the door is opened, relay means operated by the timer once the predetermined time period has elapsed to automatically close the door, and means to interrupt the timer cycle upon breaking of the sensor beam, wherein if the sensor beam is interrupted before the predetermined time cycle is completed for closing the relay, the device is inactivated and reactivation of said timing circuit only occurs when the door is closed for a predetermined period of time.

2. An automated garage door closer as set forth in claim 1, in which a radio receiver is mounted adjacent to and operatively connected to said motor and adapted to cooperate with a transmitter for activation of the motor.

3. An automated garage door closer as set forth in claim 1, in which a Schmit trigger inverter is positioned in the circuit of the audible alarm to sound the alarm at prescribed intervals.

4. An automated garage door closer as set forth in claim 3, wherein a switch is located in the closer circuit to deactivate the device.

5. An automated garage door closer as set forth in claim 1, wherein said device is operatively connected to a push button wall switch for the garage door opener/closer mechanism.

6. An automated garage door closer as set forth in claim 1, wherein mounting means for said switch housing comprises at least one strap encompassing said housing and track.

7. An automated garage door closer as set forth in claim 6, in which said switch housing consists of a box provided with a nesting lid or cover, said cover having two or more raised straps forming openings therein that receive a strap passing through the openings and around the track to secure the device to the track.

8. An automated garage door closer set forth in claim 1, including audible alarm means activated when the door reaches its fully open position.

9. An automated garage door closer as set forth in claim 8, wherein once the timer is activated, interruption of the door closer cycle by the sensor inactivates the timing circuit.

10. An automated garage door closer as set forth in claim 1, in which said circuit includes a capacitor which begins discharging when power is removed and prevents another time delay cycle.

11. An automatically controlled garage door closer device for installation on a garage having a door opening and a garage door with an upper edge and a lower edge, a reversible electric motor providing motive power to, move the door between open and closed positions on a pair of generally parallel tracks, and sensor means adjacent the lower edge of the door opening providing a beam projected across the opening, said device acting to automatically close the door if said door is inadvertently left open after a vehicle enters or exits the garage and comprises a switch housing adapted to be mounted on one of said tracks guiding the door between open and closed positions adjacent the final open position of the door, a switch within the housing having a flexible finger extending beyond the housing and into the path of the upper door edge, and a second housing containing said sensor means and a control circuit including timer means operatively connected to the motive power for the garage door for energization of the door closer once a predetermined period of time has elapsed after the door is opened, audible alarm means activated when the door reaches its fully open position, relay means operated by the timer once the predetermined time period has elapsed to automatically close the door, and means to interrupt the timer cycle upon a breaking of the sensor beam, wherein if the sensor beam is interrupted before the predetermined time cycle is completed for closing the relay, the timing circuit is deactivated and reactivation of said timing circuit only occurs when the door is closed for a predetermined period of time, said sensor means provides means to gauge the interval of interruption of said sensor beam.

12. An automated garage door closer as set forth in claim 11, in which said sensor means determines whether a vehicle or a person or animal interrupts the sensor beams by the time interval involved.

13. An automated garage door closer as set forth in claim 1, including means to detect carbon monoxide positioned in the unit.

14. An automated garage door closer as set forth in claim 13, wherein the carbon monoxide detector means is connected in said circuit to open the door when a dangerous level of gas is sensed.

15. A method for controlling a motor-driven door operator including the steps of activating a switch when the door is moved to its open position, said switch activating a sensor beam, providing a timer circuit having a predetermined time delay during which the door remains open, sounding an alarm during the time delay indicating that an automatic closer mechanism is activated, upon termination of the time delay reactivating the motor to close the door, and determining the time interval of interruption of the sensor beam and acting to activate the timing cycle based on the elapsed time interval.

16. A method for controlling a motor-driven door operator as set forth in claim 15, including the step of providing means to deactivate the timing circuit if the door closing cycle is interrupted.

17. A method for controlling a motor-driven door operator as set forth in claim 16, including the step of interrupting the door closing cycle and deactivating the timing circuit where a sensor determines that an object has interrupted the sensor beam for a short interval.

18. A method for controlling a motor-driven operator as set forth in claim 15, in which said sensor provides a short time delay after interruption of the sensor beam before initiating the timing cycle.

19. A method for controlling a motor-driven door operator as set forth in claim 18, wherein multiple interruptions of said sensor beam will not initiate the door closing cycle until the time delay after interruptions of the sensor beam has occurred.

20. A method for controlling a motor-driven door operator as set forth in claim 19, in which a pre-determined minimum time interval is gauged for passage of a vehicle through the sensor beam, wherein the elapse of the minimum time interval initiates the door closing cycle.

* * * * *